United States Patent [19]

Lods et al.

[11] Patent Number: 4,571,549
[45] Date of Patent: Feb. 18, 1986

[54] 16-QAM MODULATOR WITH PLL AMPLIFICATION DEVICES

[75] Inventors: Jean Lods, Paris; Christian Trinh Van, Brunoy, both of France

[73] Assignee: Societe Anonyme de Telecommunications, Paris, France

[21] Appl. No.: 569,482

[22] Filed: Jan. 9, 1984

[30] Foreign Application Priority Data

Jan. 7, 1983 [FR] France ............................. 83 00204

[51] Int. Cl.⁴ ...................... H03C 3/00; H04B 1/04; H04L 23/02; H04L 5/12
[52] U.S. Cl. ............................... 332/16 R; 332/17; 332/19; 332/22; 332/23 R; 375/39; 455/42; 455/110; 455/113
[58] Field of Search ............... 329/135; 332/16 R, 17, 332/19, 22, 23 R; 455/42, 110, 113; 375/39

[56] References Cited

U.S. PATENT DOCUMENTS 4,039,961  8/1977  Ishio et al. .................. 329/135 X
4,327,439  4/1982  Gockler et al. ............... 332/17 X

FOREIGN PATENT DOCUMENTS 0008763  1/1977  Japan .......................... 332/17

Primary Examiner—Eugene R. LaRoche
Assistant Examiner—D. C. Mis
Attorney, Agent, or Firm—Lowe, King, Price & Becker

[57] ABSTRACT

A 16-quadrature amplitude modulation (QAM) modulator for radio links converts a train of data into signals having a phase selected from sixteen predetermined phase values and an amplitude selected from four values. The modulator divides the data train into two data sub-trains. The two data sub-trains are respectively applied to a pair of four-phase modulators that are fed by a carrier source. The 16-QAM modulator also comprises two phase locked loops each including a voltage controlled microwave oscillator and an associated differential phase detector. The differential phase detector responds to the output of the associated four-phase modulator and the output of the associated voltage controlled microwave oscillator. Predetermined parts of the output signals of the two phase locked loops are added.

8 Claims, 5 Drawing Figures

16-QAM MODULATOR WITH PLL
AMPLIFICATION DEVICES

BACKGROUND OF THE INVENTION

1. Field of the Invention

The present invention generally relates to quadrature amplitude modulation (QAM) and particularly to nonlinear amplified quadrature amplitude modulation. More precisely, the invention relates to 16-QAM phase and amplitude modulation systems.

A diagram representing the possible relative phases and amplitudes of a 16-QAM system is represented in FIG. 1. It results from the cophasal composition of two four-phase modulated signals, the amplitude of one four-phase modulated signal being 6 dB below the other.

Systems for modulating the phase of a carrier wave by the digital pulses of a binary message have already been proposed. The better known of these are two-, four- or eight-phase systems. Thus, for a two-phase-state modulation, each bit having value 1 is represented by a carrier wave having a reference phase, i.e., phase 0, whereas each bit having value 0 is represented by a carrier wave having a phase shifted by $\pi$ compared to the phase of a binary bit. In the four-phase-state modulation case, a carrier wave takes each of four different phase values depending on the value assumed by each group of two successive bits whereupon the phase is one of four equi-spaced phases separated by $\pi/2$ of such wave.

For spectral reduction reasons, new generations of digital radio links make use of amplitude and phase multistate modulation; more particularly they use 16 amplitude-and-phase-state modulation. Multistate systems utilize a narrower passband and improve the efficiency in bits per second per Hertz. The 16-QAM constellation signal is actually impossible to amplify nonlinearly because it comprises an amplitude modulation component and a phase modulation component. Therefore, the transmitter of such a signal must operate at a level of 8 to 10 dB below saturation. This implies the need to use microwave components having extensive power margins and a very low energy yield whence high consumption. A linearly amplified 16-QAM modulator is therefore not very reliable and inefficient energy-wise.

An improvement was put forward in the IEEE transactions and communications document Vol. Com. 30 No. 3 of March 1982 by DOUGLAS H. MORAIS, and KAMILO FEHER. In this article, the 16 phase and amplitude state transmitting system is regarded as the combination of two independently operated four-phase modulators. The output signals of the modulators are amplified separately by a nonlinear amplifier. This form of amplification, which has a tendency to convert amplitude-modulation to phase-modulation, is made possible solely because the 16-QAM signal is built up by summation after amplification of both four-phase-state modulated carriers.

DESCRIPTION OF THE PRIOR ART

The prior art in the Douglas H. Morais and Kamilo Feber article is summarized with reference to FIG. 2, wherein two asynchronous nonreturn-zero (NRZ) data streams A(t) and B(t), of the same nominal bit rate, are coupled to input points 1 and 2. Each stream is converted into two synchronous streams by a separate serial-to-parallel converter. The converter responsive to the A stream derives outputs $I_1$ and $I_2$, while the second converter responsive to the B stream derives outputs $Q_1$ and $Q_2$. Outputs $I_1$ and $Q_1$ feed "QPSK modulator 1" while outputs $I_2$ and $Q_2$ feed "QPSK modulator 2"; modulators 1 and 2 are standard quaternary phase shift keying (QPSK) modulators. Modulators 1 and 2 are both driven by the same carrier source. Therefore, one input data stream is converted into two synchronous streams which form I and Q inputs to one modulator, and the other input data stream is similarly converted into two synchronous streams which form the I and Q inputs to the second modulator.

The outputs of the QPSK modulators, QPSK MOD 1 and QPSK MOD 2, are respectively amplified by nonlinear amplifiers NLA 1 and NLA 2, having equal gain and operated to derive the maximum peak output voltage available. Because the QPSK modulated signals are unfiltered, they contain no AM, and thus do not suffer data dependent degradation from the non linear amplification. The outputs of the amplifiers NLA 1 and NLA 2 are combined in a hybrid HYBRID. The coupling coefficient $\gamma$ of hybrid HYBRID has a suitable value as explained in the article.

However, although this 16-QAM modulator design affords advantages as far as the possible output power level is concerned, there are problems stemming from the complexity of the amplifiers. Indeed, the problems resulting from the operation of transistor amplifiers are well known. The considerable gain to be achieved on the transmission chain and the low gain per elementary amplifying stage result in cascading a large number of amplifier stages that are isolated by separator stages.

Further, to obtain the 16-QAM signal as perfectly as possible from two four-phase-state modulated signals, the phases and the relative levels of the two modulated signals must be constant at the outputs of the two nonlinear amplifiers. Thus, variations in the transfer functions of both amplifiers must be identical for any environmental change.

SUMMARY OF THE INVENTION

The present invention also employs nonlinear amplification of both four-phase-state modulated signals before they are summed. This amplification is, however, performed with the help of two amplification and modulation transfer devices (AMTT) each employing a single expensive microwave component. These devices also make it possible to retain easily the relative amplitudes and phases of the two four-phase-state modulated signals.

This invention uses the carrier wave from the four-phase-state modulators to control a microwave oscillator in a phased locked loop.

The AMTT device is used when the carrier wave of the four-phase-state modulated signals is in the microwave range. It is replaced by a device for amplification and modulation transfer transposition (AMTTT) if the modulated carrier wave is at an intermediate frequency, in which case the microwave transposition is performed in each phase locked loop.

In accordance with a first aspect of the invention, each phase locked loop comprises a phase detector responsive to the output signal of the four-phase-state modulator and part of the signal supplied by the microwave oscillator to an output coupling circuit. The phase detector derives an error voltage in each phase locked loop. The error voltage is fed to an input of an amplifier, before controlling the microwave oscillator.

In a first embodiment, the carrier wave is generated by a microwave local oscillator.

In a second embodiment, the carrier wave oscillator feeding the four-phase modulators has a frequency in the intermediate frequency range. A local oscillator drives frequency changers connected in the loops to cause derivation of this intermediate frequency.

Further, the output signals of the microwave oscillators, as derived from the outputs of couplers in the loops, are applied to the inputs of an automatic level control device. The control device enables the power level of both microwave oscillators to be equal.

In accordance with a preferred characteristic of the invention, the amplifier in each phase locked loop includes two parallel-mounted amplifiers, one an operational amplifier, the other a video amplifier; the amplifiers being coupled via resistor and capacitor circuits.

BRIEF DESCRIPTION OF THE DRAWINGS

Other advantages and features will become clear from the following description accompanied by the relevant drawings in which.

DESCRIPTION OF THE PREFERRED EMBODIMENTS

Figure 1:
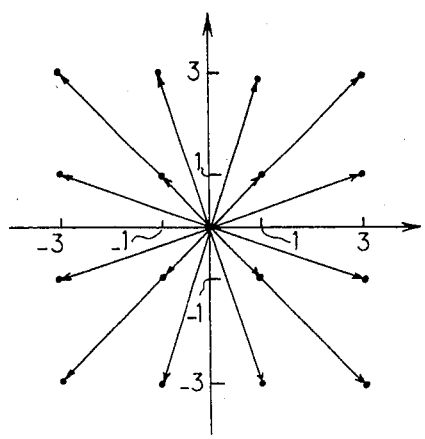
FIGS. 1 and 2 are respectively representations of 16-QAM phasors and a block diagram of a prior art 16-QAM modulator as previously described.
Figure 2:
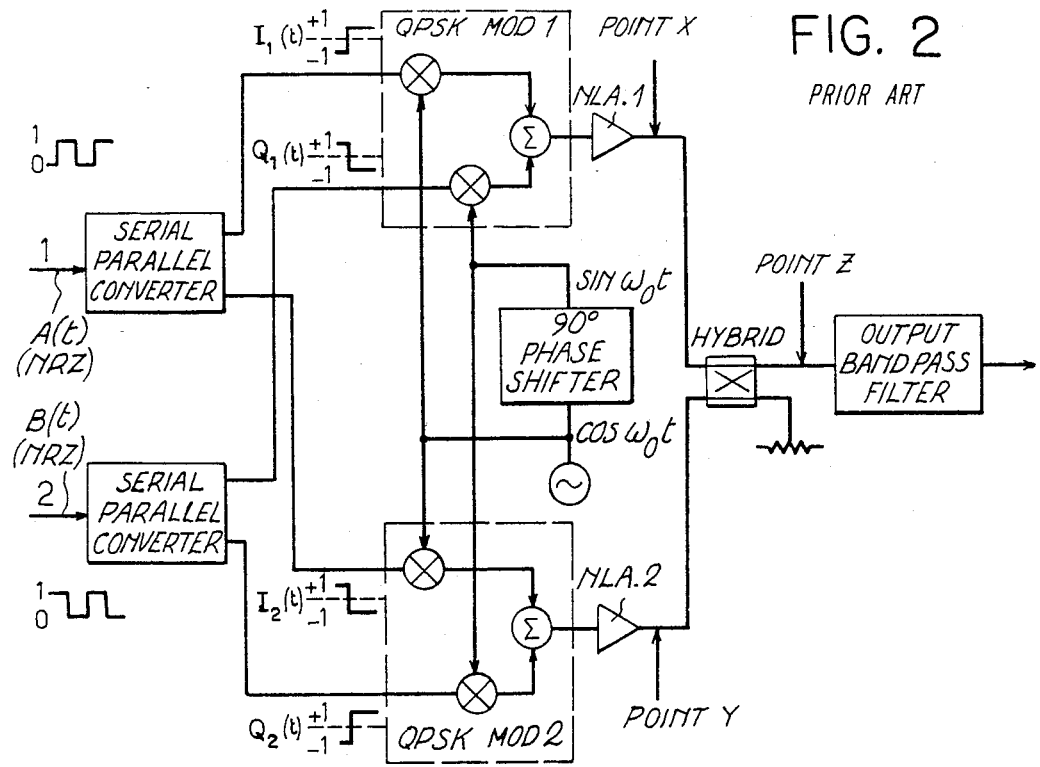
Figure 3:
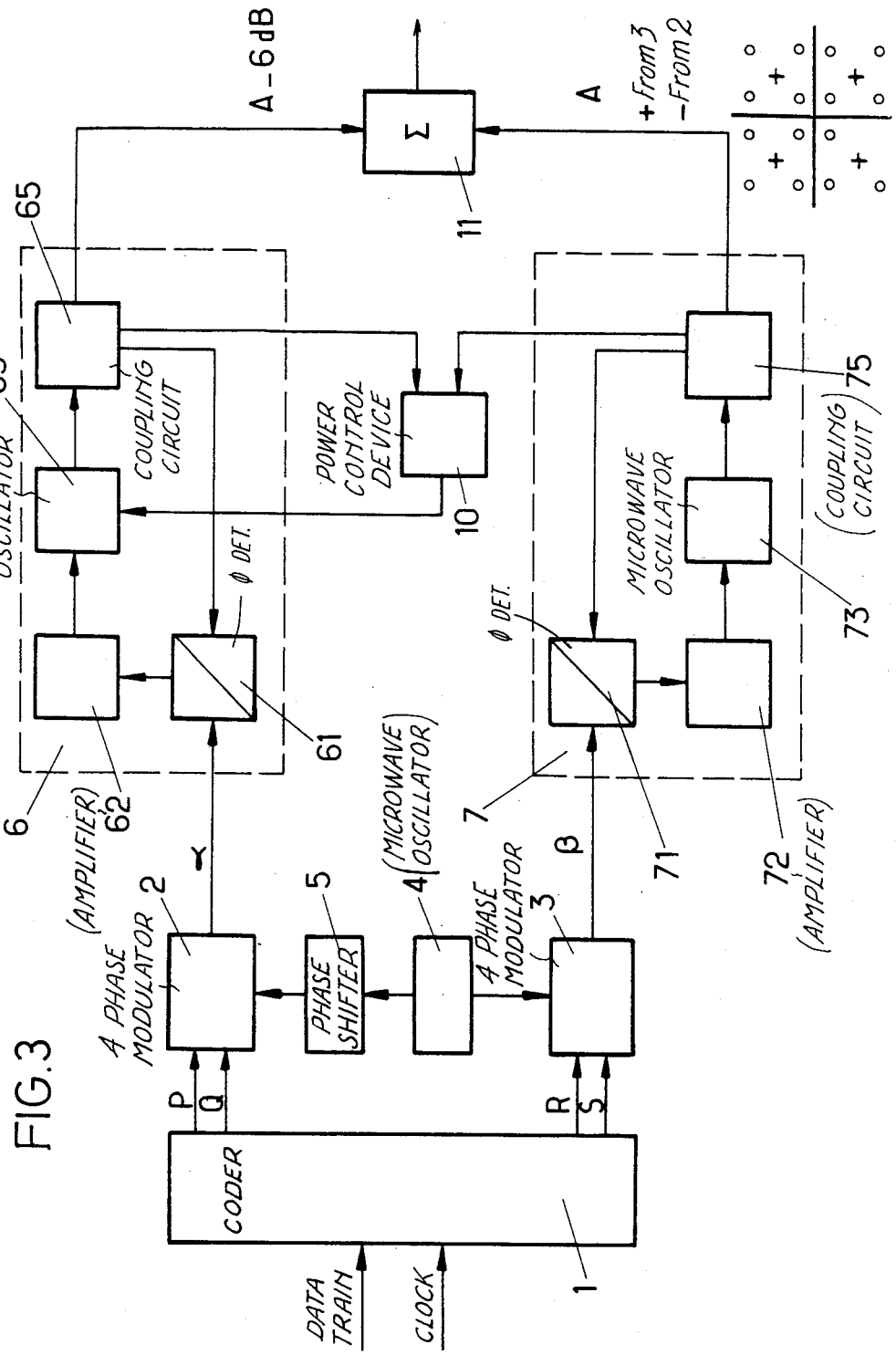
FIG. 3 is a block diagram of a 16-QAM modulator according to the invention.

With reference to FIG. 3, the incoming digital data train DT is fed to the input of an encoder 1 that divides it and encodes it into four digital trains P, Q, R, S. Digital trains P, Q, R, S are fed in groups of two to the input of each of two four-phase-state modulators 2 and 3, also responsive to a carrier wave generated by the transmitter local oscillator 4. Modulators 2 and 3 produce two four-phase modulated signals $\alpha$ and $\beta$, respectively fed to inputs of phase locked loops 6 and 7, respectively including power microwave oscillators 63 and 73. Loops 6 and 7 respectively maintain the phases of oscillators 63 and 73 equal to the phases of signals $\alpha$ and $\beta$ at the inputs of the loops.

Phase locked loop 6 includes phase detector 61 responsive to the output signal $\alpha$ of modulator 2 (capable of having one of four phase states) and to part of the output signal of voltage-controlled oscillator 63, as derived from output of coupler 65. An error voltage proportional to the phase difference between the input signals of phase detector 61 is coupled to loop amplifier 62, having an output voltage deviation sufficient to control a tuning diode in microwave power oscillator 63. The signal delivered by oscillator 63 is coupled by output coupler 65 to an input of summing circuit 11.

Loop 7 is identical to loop 6; the components of loop 7 identical to those in loop 6 have reference numerals with units digits identical to those in loop 6 and tens digits of "7".

The output signals of loops 6 and 7 are summed in summing circuit 11 which derives the 16-QAM signal. The passband of loop 6 depends on the product $A(P) \cdot K_o K_d$, where $A(P)$ is the gain of loop amplifier 62, $K_o$ (in Hertz/volt) is the slope of microwave oscillator 63, and $K_d$ equals the slope of phase detector 61 in radians/volt. For stability reasons, the passband of loop 6 cannot be increased arbitrarily because of the phase shifts prevailing in the loop due to the oscillator, phase detector, error amplifier and all lengths of microwave line. The error amplifier is thus an essential member of the phase locked loop.

Amplifier 62 must amplify the output signal of the phase detector 61 with constant gain and minimum phase shift and deliver a high DC voltage compatible with the tuning of voltage controlled oscillator 63. An error amplifier 62 exhibiting all these advantageous features is described infra and illustrated in FIG. 5.

To enable the signals supplied by phase locked loops 6 and 7 to summer 11 to be cophasal and have amplitudes differing by 6 dB, a variable phase-shifter 5 and an automatic level control device 10 are provided. Variable phase-shifter 5, responsive to the output of local transmitter oscillator 4, enables the static phase of the carrier wave of modulator 2 to be adjusted with respect to the phase at the output of the modulator 3 to adjust the phase of oscillator 63 with respect to that of oscillator 73.

The automatic level control device 10 cues the power level of microwave oscillator 63 to the power level of microwave oscillator 73 so the signal levels at the outputs of phase locked loops 6 and 7 are always offset by 6 dB. Phase shifter 5 and control device 10 thereby make it possible to eliminate any dependency between the phase adjustment and relative levels of the two carrier waves derived by modulators 2 and 3.

It is known that a phase locked loop duplicates, without distortion, the phase modulation of the signal fed to the input thereof if the modulation frequency is lower than the loop passband of the ATM system (with no transportation ) such as loops 6 and 7.

Therefore, to transmit high digital bit rates with a device such as this, the ATM system including loop 6 or 7 must have a loop passband much wider than the digital bit rate to be transmitted.

Figure 4:
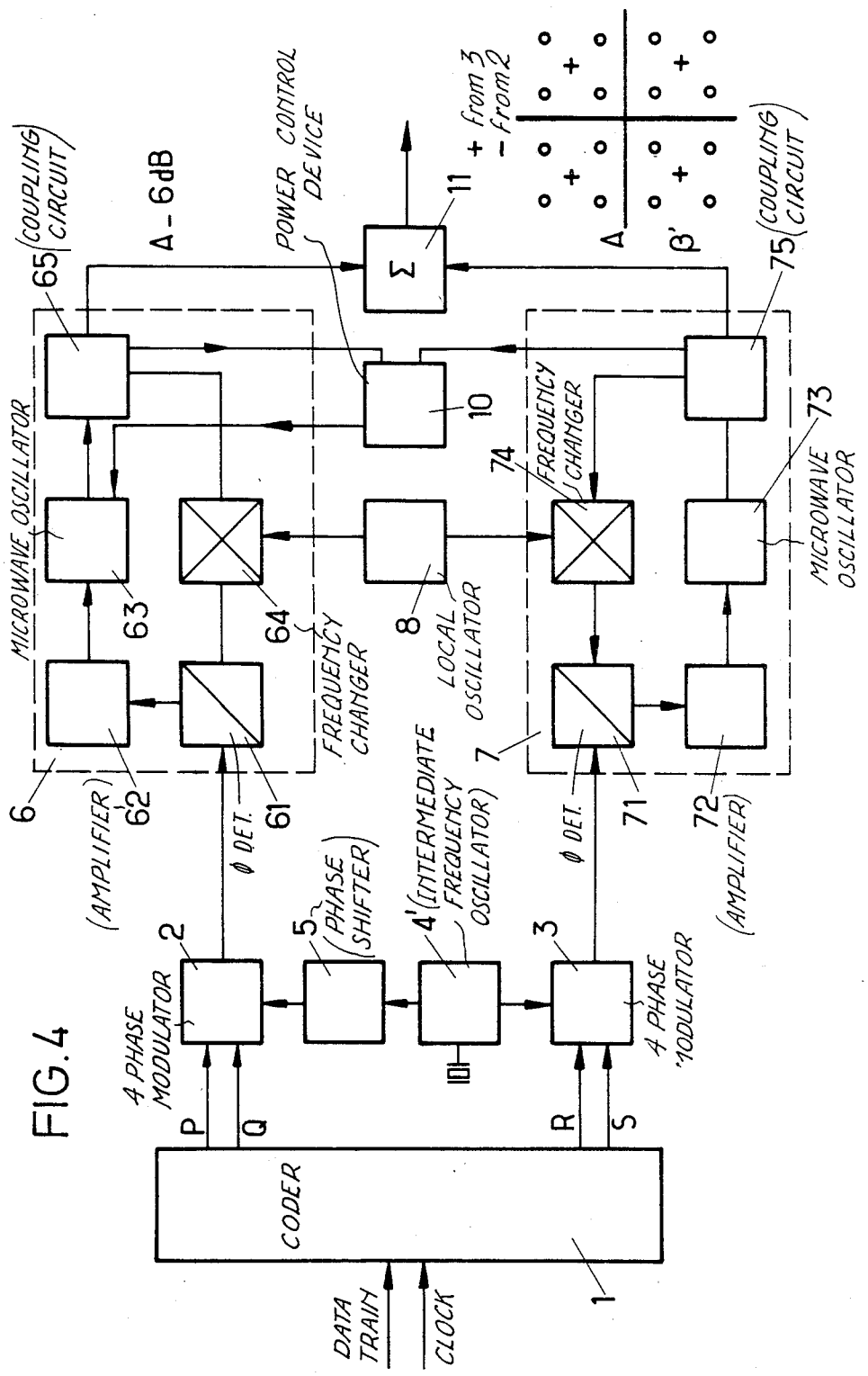
FIG. 4 is a variation of the block diagram of the modulator of FIG. 3.

In a second embodiment illustrated in FIG. 4, the local oscillator 4 is no longer a microwave oscillator. Microwave oscillator 4 is replaced by an intermediate frequency oscillator 4'; a second oscillator 8 having a frequency equal to the microwave frequency plus or minus the intermediate frequency is provided. For instance, the intermediate and microwave frequencies are in the ranges between 70 and 140 MHz and 2 and 15 GHz, respectively. Frequency changers 64 and 74 are respectively connected in loops 6 and 7 between coupling circuits 65 and 75 and phase detectors 61 and 71. The remaining parts of the 16-QAM modulator illustrated in FIG. 4 are identical to those of FIG. 3.

Figure 5:
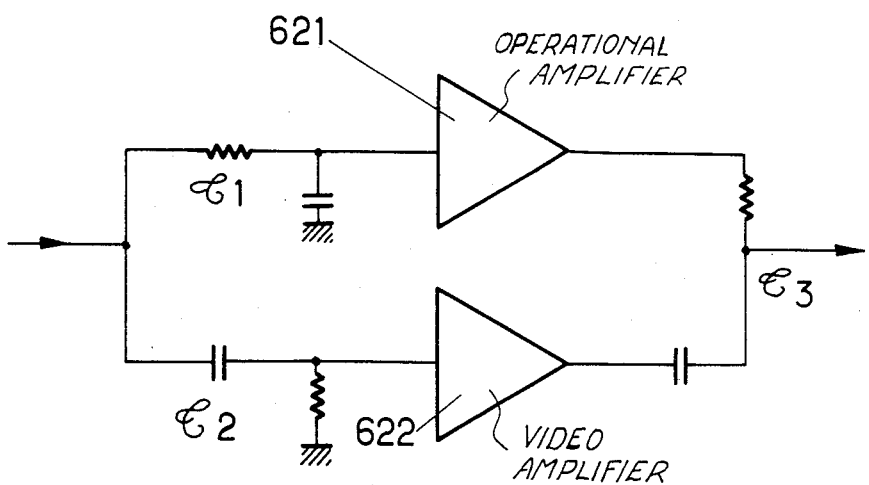
FIG. 5 is a circuit diagram of the amplifiers included in the loops of the 16-QAM modulators of FIGS. 3 and 4.

Amplifier 62, as illustrated in FIG. 5, isolates a low-frequency amplifier 621 responsive to large voltage deviations, from video amplifier 622 responsive to amplitude signals. In this way, the video amplification can be achieved with low power transistors having a very high transition frequency. The error amplifier 62 therefore comprises operational amplifier 621 coupled via RC circuitry to a video amplifier 622. Amplifier 62 of FIG. 5 has the advantage of highly differing gains for each of the amplifier paths. A very high DC gain, greater than 80 dB, of amplifier 621 prevents the static phase of the carrier wave of the 16-QAM modulator from varying with respect to that of the carrier of modulators 2 and 3 when there is a variation in the voltage of a tuning diode in one of the microwave oscillators. This voltage variation, coupled to the input of amplifier 62, is divided by the DC gain of amplifier 621, whereby the operating point on the phase detector characteristic curve varies only very slightly. The gain of video amplifier 622 is adjusted independently of the DC gain of amplifier 621 to obtain the maximum loop passband, taking into account the loop stability criteria.

The time constants $T_1$, $T_2$ and $T_3$ are selected such that the passbands of amplifiers 621 and 622 are the same; the passbands are sufficiently low with respect to the loop band width that any distortions in the amplification transfer function are compressed by the phase locked loop.

We claim:

1. A 16-quadrature amplitude modulation modulator for radio links for converting a train of data into a signal having a phase selected from 16 phase values and an amplitude selected from four values, said modulator comprising means for dividing said data train into two data sub-trains;

two four-phase modulators;

a carrier wave generator for feeding said two four-phase modulators;

means for applying said two data sub-trains respectively to said four-phase modulators;

two phase locked loops each including a voltage controlled microwave oscillator and a differential phase detector associated with said microwave oscillator, said differential phase detector being responsive to an output of one of the four-phase modulators and an output of the associated microwave oscillator for controlling said voltage controlled microwave oscillator; and means for adding predetermined parts of the output signals of the two phase locked loops.

2. A 16-quadrature amplitude modulation modulator according to claim 1 wherein the carrier wave generator oscillates at the same frequency as the voltage controlled microwave oscillators in the two phase locked loops.

3. A 16-quadrature amplitude modulation modulator according to claim 1 wherein the carrier wave generator oscillates at an intermediate frequency substantially lower than the microwave oscillator frequency and said modulator further comprises a local oscillator oscillating at a frequency which is the sum or he difference of the microwave frequency and the intermediate frequency, a frequency changer is provided in each phase loop, said frequency changer being responsive to the output signal of the microwave oscillator and the output signal of the local oscillator for deriving an output signal coupled to an input of the differential phase detector.

4. A 16-quadrature amplitude modulation modulator according to claim 1 further comprising a power comparator responsive to the output signals of the microwave oscillators of the two loops, said power comparator deriving an output coupled to an input of one of the voltage controlled microwave oscillators for maintaining the output powers of the two loops at a predetermined ratio.

5. A 16-quadrature amplitude modulation modulator according to claim 4 wherein the ratio between the output powers of the two loops is 6 dB.

6. A 16-quadrature amplitude modulation modulator according to claim 1 further including an amplifier in each phase locked loop connected between the differential phase detector and the voltage controlled microwave oscillator, said amplifier including first and second amplifiers connected in parallel, the first amplifier being a DC operational amplifier, the second amplifier being a video amplifier, said operational and video amplifiers being coupled to each other by resistor capacitor circuitry.

7. The modulator of claim 1 further comprising means responsive to the power levels in the two loops for controlling the power in one of the loops so a predetermined relation between the power levels in the two loops is maintained.

8. The modulator of claim 1 further including an amplifying means in each loop responsive to a signal having DC and video components, said amplifier means including a DC amplifier and a video amplifier, the DC amplifier having an input coupled via a low pass filter to be responsive to the DC component, the video amplifier having an input coupled via a high pass filter to be responsive to the vodeo component, the DC amplifier having an output coupled by a series resistor to an output terminal of the amplifier means, the video amplifier having an output coupled by a series capacitor to the output terminal.

* * * * *